United States Patent [19]

Bauer et al.

[11] 3,716,395

[45] Feb. 13, 1973

[54] PROCESS OF PRODUCING PIGMENTED, A HARDENABLE RESIN CONTAINING PAPER SHEETS, AND PRODUCTS

[75] Inventors: Hans Bauer, Ulm-Urblingen; Helmut Holzer, Neu-Ulm/Donau, both of Austria; Gerhard Schmidt, Altheim ob Weithung, Germany

[73] Assignee: Sued-West-Chemie GmbH, Neu-Ulm/Donau, Germany

[22] Filed: Oct. 31, 1968

[21] Appl. No.: 772,400

[30] Foreign Application Priority Data

Oct. 31, 1967 Germany............P 16 96 261.1

[52] U.S. Cl..................117/68, 117/76 P, 117/104, 117/155 L, 117/161 LN
[51] Int. Cl...............................................B05c 9/04
[58] Field of Search....117/71, 68, 76, 111, 104, 155, 117/161

[56] References Cited

UNITED STATES PATENTS

| | | | |
|---|---|---|---|
| 3,197,331 | 7/1965 | Rohn | 117/76 X |
| 3,200,008 | 8/1965 | Holtschmidt et al. | 117/76 X |
| 3,288,632 | 11/1966 | Rush et al. | 117/76 X |
| 3,326,712 | 6/1967 | Sanders | 117/76 |
| 3,493,419 | 2/1970 | Jones et al. | 117/76 |

*Primary Examiner*—Carl D. Quarforth
*Assistant Examiner*—Stephen J. Lechert, Jr.
*Attorney*—Erich M. Radde, Charles A. McClure, Gerard J. Weiser and Alfred Stapler

[57] ABSTRACT

A paper sheet is impregnated with a hardenable resin and a pigment and is coated with a mixture of a hardenable resin, a pigment, and a plasticizer. It may additionally be provided with a substratum layer of a hardenable resin on the surface opposite the coated surface. Such a paper sheet can be attached to a suitable base or carrier material by hot pressing. The paper sheet of this invention has the advantage over the heretofore used, simply coated paper sheet that the basis weight of the paper and the amount of impregnating resin can be reduced, that the paper, after pressing, has a higher degree of flexibility, that its craze and crack resistance is considerably improved, and that its hiding, masking, or covering power is superior to that of heretofore produced pigmented and resin coated paper sheets so that light color shades of the resulting laminated articles can be produced in a simple and inexpensive manner. The preferred hardenable impregnating and coating resin in a melamine-urea-formaldehyde resin.

10 Claims, No Drawings

PROCESS OF PRODUCING PIGMENTED, A HARDENABLE RESIN CONTAINING PAPER SHEETS, AND PRODUCTS

BACKGROUND OF THE INVENTION

1. Field of the Invention

The present invention relates to hardened, plastics-containing cover or surface coating layers or sheets of paper and more particularly to such a layer laminated to a supporting base, and to a process of making same.

2. Description of the Prior Art

Cover or surface coating layers or sheets provided with a hardenable synthetic resin are applied by hot-pressing to a supporting base material, especially to fibrous sheets or, respectively, shaped fibrous bodies such as supporting sheets or boards. Thereby, the hardenable or thermosetting synthetic resin is hardened or cured to a hardened, cured, or thermoset plastic material. Often it becomes necessary to provide such paper layers or sheets with pigments to hide the supporting base and/or to mask or change its appearance. To achieve this effect, the pigments must be present in relatively large amounts relative to the resin and also to the paper. Large amounts of pigments can be applied to or coated upon paper layers or sheets which may be impregnated with a synthetic resin or plastic material, in the form of a cover or surface coating layer or sheet consisting of a hardenable, curable, or thermosetting synthetic resin. Such a cover or surface coating layer or sheet may contain further additives such as plasticizers, hardeners, and others.

Processes which yield such paper surface coating layers of satisfactory hiding or masking power which contain pigments, are known. However, these known processes do not meet the requirements if very large amounts of pigments are necessary to produce a specific, light color tone or shade upon a dark base, carrier plate or supporting sheet of non-uniform tone or shade, and also if the weight in g. per sq.m. and the hiding or masking power or, respectively, the filling and loading capacity of the paper sheet to be applied to the supporting base are limited and insufficient so that such a cover layer or surface coating containing only a limited amount of pigment, is unable to produce a uniform, light surface color tone.

SUMMARY OF THE INVENTION

It is one object of the present invention to provide pigmented, hardened plastics-containing cover or surface layers on sheets of paper to be laminated to a suitable base material which coated paper sheets are free of the disadvantages of the known pigmented paper layers or sheets.

Another object of the present invention is to provide a simple and effective process of making such pigmented, plastics-containing cover or surface layers on sheets of paper.

A further object of the present invention is to provide an intermediate pigmented, hardenable, or curable plastics-containing cover or surface layer on sheets of paper which, on hot-pressing to a suitable base, yields laminates of superior properties.

Still another object of the present invention is to provide a laminate of a fibrous or other supporting layer or base laminated with such a pigmented, hardened plastics-containing covering sheet of paper.

A further object of the present invention is to provide a simple and effective laminating process of producing such a laminate.

Other objects of the present invention and advantageous features thereof will become apparent as the description proceeds.

In principle the process according to the present invention comprises a. impregnating a paper sheet with a mixture of a hardenable, curable, or thermosetting plastic material, preferably a melamine- and/or urea-formaldehyde resin, and a pigment, b. preferably predrying the resulting pigmented, resin-impregnated paper sheet, c. applying thereto a coating layer composed of a hardenable, curable, or thermosetting plastic material, also preferably a melamine- and/or urea-formaldehyde resin, a pigment, and a plasticizer, and d. preferably drying the resulting coated paper sheet.

Preferably the impregnating preparation used for impregnating the paper sheet contains the resin and the pigment in a proportion of resin to pigment between about 80 : 20 and about 50 : 50 and preferably in a proportion of 60 : 40. Further additives, such as hardening or curing accelerators or retarders, plasticizers, fillers, dyestuffs, or others may be admixed thereto.

The pigmented coating or surface layer contains the resin and pigment preferably in a proportion of resin to pigment between about 70 : 30 and about 30 : 70. Especially suitable have proved to be mixtures wherein the pigment is present in a proportion of resin to pigment between about 50 : 50 and about 40 : 60, i.e. the amount of pigment in the coating or surface layer is usually higher than in the impregnating mixture.

Especially suitable plasticizers are those known for plasticizing the respective synthetic resin. Plasticizers for melamine-formaldehyde resins are, for instance, polyvalent aliphatic alcohols, such as propanediol, pentaerythritol, sorbitol, etherified methylol melamines such as melamine methylol alkyl ethers, or sugars, such as mono-, di-, and/or polysaccharides, and their mixtures. When using, for instance, mixtures of sorbitol and sugar as plasticizer, the preferred amounts of such a plasticizer mixture in the surface coating are between about 30 percent and about 50 percent of the weight of the melamine resin and the pigment (1 : 1).

The resin surface layer may be dyed by the addition of the suitable dyestuffs or by using suitably colored pigments.

The surface coating is preferably applied after the impregnated paper sheet has been predried, but it may also be applied directly after impregnation.

After coating the impregnated paper sheet with the coating preparation of synthetic resin, pigment, and plasticizer, the opposite surface of said paper sheet may be provided with a plastic sizing layer or substratum coating the plastic material thereof being a hardenable resin, preferably also a melamine-formaldehyde resin. Said substratum coating may be applied simultaneously with the application of the pigmented, plastic-containing coating to the opposite surface of the paper sheet. It may also be coated thereon before or after applying said pigment coating to the opposite surface of the paper sheet.

If such a plastic sizing or substratum coating is applied, it is necessary to dry the resulting coated paper sheet. The pigment-resin-plasticizer coating, however, need not be dried. Both surface coating may also be dried simultaneously.

Incorporation of pigments into the impregnating resin composition results in a considerable reduction of the amount of impregnating resin in the paper. This has the effect that the paper sheet according to the present invention, after pressing, retains a higher degree of flexibility than a paper fiber-free, pigmented, colored surface layer applied directly to the impregnated paper. Due thereto, the crack resistance of the surface of the improved laminated panel boards is increased considerably because differences in expansion and contraction or shrinkage between the hardened or cured surface layer and the supporting base material as they are caused by changes in temperature are better compensated for than heretofore possible. Thus it is not necessary to provide a special substratum or plastic sizing layer to equalize and compensate for said differences in expansion.

Any type of paper may be used for the purpose of the present invention. Wood fiber-free, textile pulp paper, i.e. rag paper and the like, filled and loaded with pigments during its manufacture as conventionally used as so-called decorative paper has proved of value. It is, however, also possible to use bleached or unbleached, filler-free soda kraft paper.

The basis weight of such papers is usually between about 80 g./sq.m. and about 170 g./sq.m. but may vary between about 40 g./sq.m. and 60 g./sq.m., on the one hand, and between about 200 g./sq.m. and 220 g./sq.m., on the other hand, although it is not limited to such basis weights.

The synthetic resin used for impregnating the paper sheet may be a melamine-formaldehyde resin. Such melamine-formaldehyde resins, however, are relatively expensive. Therefore, mixtures thereof with the less expensive urea-formaldehyde resins or, respectively, mixed condensation products of melamine, urea, and formaldehyde are preferred.

The degree of condensation of the impregnating resin is adjusted depending upon the proportion of impregnating resin and pigment in the impregnating preparation. When using a proportion of 70 parts of resin and 30 parts of pigment for impregnation, melamine-urea-formaldehyde condensation products with a curing time between about 4 minutes to about 9 minutes at 140° C. are especially useful.

Any type of pigment may be used, preferably, of course, pigments as they are employed in plastics and lacquers. Suitable pigments are, for instance, titanium dioxide, aluminosilicates such as kaolin clays, muscovite mica, attapulgite and others, talc, calcium carbonate, aluminum oxide hydrate, satin white, barium sulfate, zinc oxide, calcium sulfate, magnesium carbonate, calcium silicate, zinc sulfide, lithopone, and others. Colored pigments may also be used.

Especially suitable are, for instance, titanium dioxide pigments such as the pigments sold under the trademark "Kronos 56 N" or "Kronos 56 L" by Titangesellschaft m.b.H. Less expensive pigments which are less fast to light may be used in the impregnating dispersion while the surface coating composition should contain pigments of superior fastness to light.

As stated above, the pigmented and, if desired, colored surface coating according to the present invention preferably consists of a pigmented melamine-formaldehyde resin containing relatively large amounts of pigment, for instance, in the proportion of about 60 percent of pigment to about 40 percent of resin. Such a coating preparation also contains a plasticizer of such a type and in such an amount that a highly plasticized mixture is obtained. Said mixture is dyed and homogenized, preferably on two- or multi-roll mills, and is applied as a highly viscous paste to the pigment-resin impregnated paper, preferably after said paper has been predried. Coating may also be effected by spraying.

The synthetic resin used for surface coating is preferably of a high degree of condensation and has a relatively short curing time. Resins with a curing time between about half a minute to about 2 minutes at 140° C. have proved to be especially suitable. If necessary, curing accelerating or retarding agents may be added in order to adjust the curing time to the desired time. The pigment used should be highly fast to light. The coating composition may contain other filler materials such as cellulose, asbestos, glass fiber, and others, in addition to the pigments.

It may be mentioned that the curing time as given hereinabove on page 8, lines 25 to 27, and page 9, lines 29 to 30, refers to the time required to convert the resin of the A-stage, i.e. a resin which can be molten and is soluble in solvents, into a resin of the B-stage, i.e. a resin which cannot be molten but forms, on heating, a rubber-like, elastic material of only limited solubility in solvents. The curing time to the B-stage can readily and exactly be determined by the following method. A metal plate provided with recesses is placed into a drying oven at about 140° C. About 200 mg. of the resin to be tested are placed into the recesses of the plate heated to the curing temperature. The time at which the resin starts to melt is noted as zero point. The molten sample is worked with a glass rod and forms, on removal of the rod from the melt, short strings or threads. As soon as no more threads or strings can be drawn from the melt, i.e. as soon as the heated resin has lost its ropiness or stringiness, the resin of the A-stage is converted into a resin of the B-stage. This time is also noted and the interval between the zero point and this moment is the curing time mentioned above which is also designated as B-time.

The substratum layer may be composed of any type of hardenable resin although melamine-formaldehyde resins have proved to be especially suitable. Resins with a curing time at 140° C. corresponding to the subsequent drying time, also at 140° C., have proved to yield especially good results.

DESCRIPTION OF THE PREFERRED EMBODIMENTS

The following examples serve to illustrate the present invention without, however, limiting the same thereto.

Example 1

An unloaded, bleached soda kraft paper of the basis weight of 80g./sq.m. to 100 g./sq.m. is impregnated with an aqueous dispersion of a mixture of 30 parts, by weight, of titanium dioxide RN 56 which is of relatively low fastness to light, or of zinc sulfide and 70 parts, by dry weight, of a melamine-urea-formaldehyde copolycondensation product or of a melamine-formaldehyde resin. The dispersion is prepared by adding the pigment to a 55 percent aqueous solution of the resin while stirring with a high speed stirrer. The viscosity of the starting resin solution corresponds to an outflow speed of 14 seconds from a 4 mm. DIN beaker. The outflow speed of the resulting dispersion of 30 percent of pigment therein is 17 seconds. The paper is preferably impregnated by applying the dispersion by means of a damping roll to the lower paper surface or its screen side so that the impregnating dispersion slowly penetrates into the paper and replaces the air present therein. The impregnating duration is prolonged by the use of an impregnating trough of a length of 2 m. to at least 30 seconds. The paper is completely immersed into the impregnating trough shortly before impregnating by one-sided application to the screen surface of the paper is completed. The increase in weight of the paper by impregnation with the mixture of pigment and resin amounts to between about 80 percent and about 90 percent of the basis weight of the paper. The thus pre-impregnated paper is dried to a content of volatile components between about 3 percent and about 4 percent. Such intermediate drying is effected preferably by passing the impregnated paper through two drying zones, each being of a length of about 6 m. The temperature in said drying zones is between about 120° C. and about 140° C. The passage time through the drying zones is about one minute to two minutes. Thereby, further condensation of the impregnating resin takes place. The content of volatile components in the predried impregnated paper is determined by placing it into a drying chamber and keeping it therein at 160° C. for about 5 minutes. Predrying of the impregnated paper improves the adherence of the subsequent pigment coating to the paper.

After drying, its upper surface is coated with a dyed, pigmented coating composition of a highly plasticized melamine-formaldehyde resin of a mixture of 69 parts, by weight, of titanium dioxide sold under the trademark "Kronos 56 L" which is very fast to light, 23 parts, by weight, of a melamine-formaldehyde resin, and 8 parts, by weight, of sorbitol as plasticizer. This mixture is homogenized on a rolling mill and the homogenized mixture is mixed with 46 parts, by weight, of melamine-formaldehyde resin. The mixture is applied to the pretreated paper by means of a suitable spraying device. The resulting surface coating amounts to between about 25 g./sq.m. and about 35 g./sq.m. (in the dry state). In addition, and preferably simultaneously the pre-impregnated paper is sprayed at its lower surface with a substratum coating of about 5 g./sq.m. (in the dry state). The substratum back coating is also a melamine-formaldehyde resin of a B-time of 2 minutes at 140° C. The thus coated paper sheet is dried at about 140° C. for 30 seconds to two minutes.

The resulting paper sheet is able to replace, after pressing, in its unicolored covering and decorative effect a conventionally treated, highly loaded textile pulp paper of the basis weight of 170 g./sq.m. to 200 g./sq.m.

The impregnated and coated, twice pigmented paper is pressed together with wood fiber plates or chipboards and the like under a pressure of about 20 kg./sq.cm. at a temperature of 145° C. for about 6 minutes and is cooled under such pressure for three minutes.

Example 2

A rag paper containing up to 30 percent of titanium dioxide and having a basis weight of 80 g./sq.m. is preimpregnated as described in Example 1 and is then provided with a pigmented surface resin coating at its upper surface and with a substratum resin coating at its lower surface in the same manner as described in Example 1.

The resulting pre-impregnated and coated paper sheet has a uniformly colored surface of a hiding or covering power which is considerably improved over that of a conventionally treated paper sheet. As a result thereof, the application of a barrier coating to improve the hiding or covering power can be omitted.

Example 3

A bleached, unloaded soda kraft paper of the basis weight of 150 g./sq.m. is pre-impregnated and coated as described in Example 1. After pressing, its hiding or covering power and its unicolored decorative effect corresponds to that of a conventionally treated, highly loaded, decorative rag paper of the basis weight of 150 g./sq.m. provided by pressing with a textile pulp barrier film of the basis weight of 100 g./sq.m. to 150 g./sq.m.

The following Table shows the increase in basis weight by the resin-impregnation and twofold pigmenting process according to the preceding examples.

Table 1

| Example | Starting paper basis weight in g./sq.m. | Treated paper basis weight in g./sq.m. |
| --- | --- | --- |
| 1 | 80 – 100 | 174 – 234 |
| 2 | 80 | 174 – 192 |
| 3 | 150 | 325 |

The amounts of pigment contained in paper treated according to the present invention as compared with paper treated according to known methods are given in Table 2. The amount of pigment per sq.m. indicates the hiding or masking power of the respective paper.

Table 2

| Basis weight of paper | Amount of pigment in g./sq.m. resin treated according to the present invention |
| --- | --- |
| conventionally resin treated | |
| pigmented rag paper: 80 g./sq.m. | 66 |
| 24 | |
| soda kraft paper: 80 g./sq.m. | 42 |
| 0 | |
| pigmented rag paper: 150 g./sq.m. | about 105 |
| 45 | |
| soda kraft paper: 150 g./sq.m. | 60 |
| 0 | |

It is, of course, understood that the type of paper, synthetic resin, pigment, and plasticizer used for carrying out the present invention may be varied as explained hereinabove.

The preferred pigment for the coating resin layer is titanium dioxide of the Rutil-type which is fast to light while the impregnating resin may contain titanium dioxide of lower fastness to light, zinc sulfide and others.

Coloring pigments such as those sold under the trademarks "Oxidgelb OIV;" "Flammruss K 10830;" "Oxidrot AHK-F;" "Nickel-Titan-Gelb AN neu" by Farbenfabriken Sigle & Co. of Stuttgart may also be admixed to the impregnating dispersion as well as to the surface coating.

The resulting pigmented, plastics-containing paper sheets are especially useful for laminating to a suitable base. Thus table tops, refrigerator door liners, light diffusers, wall paneling, schoolroom desk tops, hotel, business, and home furniture surfacing, and many other articles can be produced. Final pressing and curing is effected in a manner known per se at the temperature and under the pressure required for the respective synthetic resin.

Temperatures between about 135° C. and about 155° C. for 3 minutes to 6 minutes on laminating the impregnated and coated paper according to the present invention have proved to yield laminates of superior properties.

Of course, many changes and variations in the paper, synthetic resin, pigment, plasticizer, and other additives used, in the composition of the impregnating mixture, the surface coating preparation, and the substratum coating preparation, in the manner in which these compositions are applied to the paper, in the predrying, curing, and pressing conditions, and the like may be made in accordance with the principles set forth herein and in the claims annexed hereto.

We claim:

1. A pigmented paper sheet containing a curable resin, said paper sheet being impregnated with a mixture of a pigment and a curable resin selected from the group consisting of a melamine-formaldehyde resin, a urea-formaldehyde resin, and a melamine-urea-formaldehyde resin, the proportion of pigment and curable resin in said impregnated paper sheet being between about 80:20 and about 50:50, one side surface of said impregnated paper sheet being coated with a mixture of a curable resin, a pigment, and a plasticizer for said resin, the proportion of resin to pigment in said coating being between about 70:30 and about 30:70, the curable resin being selected from the group consisting of a melamine-formaldehyde resin, a urea-formaldehyde resin, and a melamine-urea-formaldehyde resin.

2. The pigmented paper sheet of claim 1, in which additionally the side surface of said paper sheet opposite the coated side surface is provided with a substratum layer of a curable resin selected from the group consisting of a melamine-formaldehyde resin, a urea-formaldehyde resin, and a melamine-urea formaldehyde resin.

3. In a process of producing a pigmented, a curable resin containing paper sheet, the steps which comprise
   a. impregnating the paper sheet with an aqueous dispersion of a pigment and a curable resin selected from the group consisting of a melamine-formaldehyde resin, a urea-formaldehyde resin, and a melamine-urea-formaldehyde resin, the proportion of resin to pigment in said aqueous dispersion being between about 80 : 20 and about 50 : 50,
   b. coating one side surface of the resulting impregnated paper sheet with a homogenized mixture of a pigment, a curable resin selected from the group consisting of a melamine-formaldehyde resin, a urea-formaldehyde resin, and a melamine-urea-formaldehyde resin, and a plasticizer for said curable resin, the proportion of resin to pigment in said mixture being between about 70 : 30 and about 30 : 70, and
   c. drying the resulting impregnated and coated paper sheet.

4. In a process of producing a pigmented, a curable resin containing paper sheet, the steps which comprise
   a. impregnating the paper sheet with an aqueous dispersion of a pigment and a curable resin selected from the group consisting of a melamine-formaldehyde resin, a urea-formaldehyde resin, and a melamine-urea-formaldehyde resin, the proportion of resin to pigment in said aqueous dispersion being between about 80 : 20 and about 50 : 50,
   b. coating one side surface of the resulting impregnated paper sheet with a homogenized mixture of a pigment, a curable resin selected from the group consisting of a melamine-formaldehyde resin, a urea-formaldehyde resin, and a melamine-urea-formaldehyde resins, and a plasticizer for said curable resin, the proportion of resin to pigment in said mixture being between about 70 : 30 and about 30 : 70,
   c. providing the other side surface of the paper sheet opposite the one side surface of the paper sheet coated in step (b) with a substratum coating of a curable resin selected from the group consisting of a melamine-formaldehyde resin, a urea-formaldehyde resin, and a melamine-urea-formaldehyde resin, and
   d. drying the resulting impregnated and coated paper sheet.

5. The process of claim 3, in which the paper sheet is dried after impregnating it in step (a) and before coating one of its surfaces with the homogenized mixture of pigment, curable resin, and plasticizer in step (b).

6. The process according to claim 3, in which the homogenized mixture of curable resin, pigment, and plasticizer used for coating the impregnated paper sheet in step (b) is a mixture homogenized by passing it through roll mills.

7. The process according to claim 4, in which the homogenized mixture of curable resin, pigment, and plasticizer used for coating the impregnated paper sheet in step (b) is a mixture homogenized by passing it through roll mills.

8. The process according to claim 21, wherein the mixture of curable resin, pigment, and plasticizer is applied in step (b) to the impregnated paper by spraying.

9. The process according to claim 4, wherein the mixture of curable resin, pigment, and plasticizer is applied in step (b) to the impregnated paper by spraying.

10. The process of claim 4, in which the paper sheet is dried after impregnating it in step (a) and before coating its surfaces in steps (b) and (c).

* * * * *

UNITED STATES PATENT OFFICE
CERTIFICATE OF CORRECTION

Patent No. 3,716,395      Dated February 13, 1973

Inventor(s) HANS BAUER ET AL.

It is certified that error appears in the above-identified patent and that said Letters Patent are hereby corrected as shown below:

Abstract, line 19: "in" should read -- is --;
Column 2, line 51: "the" is to be cancelled;

Column 6, Table 2: Change the Table to read as follows:

Table 2

| Basis weight of paper | Amount of pigment in g./sq.m. resin treated according to the present invention | conventionally resin treated |
|---|---|---|
| pigmented rag paper: 80 g./sq.m. | 66 | 24 |
| soda kraft paper: 80 g./sq.m. | 42 | 0 |
| pigmented rag paper: 150 g./sq.m. | about 105 | 45 |
| soda kraft paper: 150 g./sq.m. | 60 | 0 |

Signed and sealed this 10th day of July 1973.

(SEAL)
Attest:

EDWARD M. FLETCHER, JR.
Attesting Officer

Rene Tegtmeyer
Acting Commissioner of Patents